US012586939B2

(12) United States Patent
Guillet

(10) Patent No.: US 12,586,939 B2
(45) Date of Patent: Mar. 24, 2026

(54) ELECTRONIC DEVICE WITH FORCE FEEDBACK AND INTERLOCKING SYSTEM FOR COUPLING TWO ELECTRONIC BOARDS

(71) Applicant: EDGE TECHNOLOGIES, Aix-en-Provence (FR)

(72) Inventor: Thomas Guillet, Gardanne (FR)

(73) Assignee: EDGE TECHNOLOGIES, Aix-en-Provence (FR)

( * ) Notice: Subject to any disclaimer, the term of this patent is extended or adjusted under 35 U.S.C. 154(b) by 356 days.

(21) Appl. No.: 18/561,387

(22) PCT Filed: May 4, 2022

(86) PCT No.: PCT/FR2022/050863

§ 371 (c)(1),
(2) Date: Nov. 16, 2023

(87) PCT Pub. No.: WO2022/243618

PCT Pub. Date: Nov. 24, 2022

(65) Prior Publication Data

US 2024/0243502 A1 Jul. 18, 2024

(30) Foreign Application Priority Data

May 17, 2021 (FR) ...................................... 2105102

(51) Int. Cl.
*H01R 13/447* (2006.01)
*G01D 11/24* (2006.01)
(Continued)

(52) U.S. Cl.
CPC ........... *H01R 12/73* (2013.01); *G01D 11/245* (2013.01); *H01R 13/447* (2013.01); *H01R 13/639* (2013.01); *H01R 13/6683* (2013.01)

(58) Field of Classification Search
None
See application file for complete search history.

(56) References Cited

U.S. PATENT DOCUMENTS 7,389,695 B2 * 6/2008 Skwara ................. G01L 19/086
73/708
9,322,678 B1 * 4/2016 Stawitzky ............ G01D 11/245
(Continued)

OTHER PUBLICATIONS

International Search Report for corresponding application PCT/FR2022/050863 filed May 4, 2022; Mail date Aug. 19, 2022.

*Primary Examiner* — Tho D Ta
(74) *Attorney, Agent, or Firm* — CANTOR COLBURN LLP

(57) ABSTRACT

An electronic device (1) comprising two electronic boards and a force feedback and interlocking coupling system for mechanically and electrically coupling same, comprising: a base (2) receiving a daughterboard having daughter connectors; a compressible retraction assembly received in the base and configurable between an idle configuration, wherein the daughter connectors are retracted, and a compressed configuration, wherein the daughter connectors are extended; a removable support assembly (4) receiving an electrical battery and having a lower portion (41) supporting mother connectors connected to a motherboard and capable of being interconnected with the daughter connectors in the compressed configuration and capable of being disconnected in the idle configuration; a protective cover (7) mounted on the removable support assembly; and an interlocking system (8) for locking the protective cover (7) onto the removable support assembly.

18 Claims, 8 Drawing Sheets

(51) Int. Cl.
   H01R 12/73      (2011.01)
   H01R 13/639     (2006.01)
   H01R 13/66      (2006.01)

(56) References Cited

U.S. PATENT DOCUMENTS

| | | | |
|---|---|---|---|
| 10,697,809 B1 | 6/2020 | Muller et al. | |
| 2003/0148672 A1* | 8/2003 | Henry | G01D 21/02 |
| | | | 439/894 |
| 2013/0025115 A1 | 1/2013 | Stormbom | |
| 2014/0126329 A1* | 5/2014 | Guyton | G01V 1/18 |
| | | | 367/76 |
| 2018/0017415 A1 | 1/2018 | Ketterer | |
| 2019/0250290 A1* | 8/2019 | Oeverland | H02H 9/04 |
| 2020/0208380 A1 | 7/2020 | Chapman et al. | |

* cited by examiner

1

ELECTRONIC DEVICE WITH FORCE FEEDBACK AND INTERLOCKING SYSTEM FOR COUPLING TWO ELECTRONIC BOARDS

TECHNICAL FIELD

The disclosure relates to an electronic device comprising two electronic boards, mother and daughter, as well as a force feedback and interlocking coupling system for mechanically and electrically coupling the two electronic boards.

Also, the disclosure concerns an electronic device allowing rapid connection/disconnection, both mechanical and electrical, between two electronic boards, to provide a modularity, an interchangeability and a simplified maintenance, and also allowing an electrical operation by a mechanical locking and an electrical cut-off by a mechanical unlocking.

The disclosure finds a preferred, and non-limiting, application for a measurement system comprising such an electronic device associated with a sensor for measuring the physical parameter, and in particular for a measurement system which is autonomous and connected, also called connected autonomous sensor.

BACKGROUND

In known manner, in the field of the connected autonomous sensors, it is known to integrate, in the same housing, a single electronic board connected to an antenna and to a sensor, to remotely transmit the sensor data from the sensor, and an electric battery.

However, such a solution has numerous drawbacks, the main one being to be dedicated to a specific sensor, assembled in the factory, without the possibility of modularity or interchangeability on the sensor. Indeed, the design of the housing and of the electronic board are such that it is not possible to replace the sensor by another sensor, or another sensor model.

Furthermore, the existing connected autonomous sensors are generally designed to respond to factory mounting issues, to the detriment of maintenance operations which will follow during the life of the sensor, in particular operations of replacing the electric battery and a possible broken component. Also, it is common for a broken sensor to be completely replaced by a new sensor, which is both costly and a source of waste.

BRIEF SUMMARY

The disclosure proposes to resolve all or part of the drawbacks, by proposing an electronic device which makes it possible to mechanically and electrically couple, with interlocking, a motherboard to a daughterboard.

The disclosure finds a preferred, and non-limiting, application with a motherboard equipped with a transmitter (or a transmitter/receiver) associated with a daughterboard of the sensor board type, to provide a function for remotely communicating the measurement data from a sensor.

An aim of the disclosure is therefore to allow an interchangeability at the daughterboard, and for example to allow an interchangeability of the sensor board mentioned above, which has the advantage of being able to use numerous common elements for different electronic devices, which will differ by their secondary electronic boards, and therefore by their types of sensors.

Another aim of the disclosure is to allow easy mounting/demounting of the electronic device, in particular to facilitate the maintenance operations (battery change, replacement of a component, . . . ), and preferably without specific tools or particular expertise.

Another aim is to allow an electrical and mechanical uncoupling which is secure, and in particular which automatically cuts off the electrical power supply of the two boards during a mechanical unlocking.

For these purposes, the disclosure proposes an electronic device comprising two electronic boards composed of a motherboard and of a daughterboard, this electronic device comprising a force feedback and interlocking coupling system allowing mechanically and electrically coupling of the two electronic boards, this force feedback and interlocking coupling system comprising:

a base including a sleeve extending along a longitudinal axis and internally delimiting a base space, in which the daughterboard is received within the base space and has daughter connectors extending parallel to the longitudinal axis;

a compressible retraction assembly received within the base space, comprising two plates between which at least one compressible push member is interposed and including a lower plate placed on the daughterboard and provided with lower orifices through which the daughter connectors pass and an upper plate provided with upper orifices aligned with the lower orifices to allow the passage of the daughter connectors, said compressible retraction assembly being configurable between an idle configuration in which the lower plate and the upper plate are spaced apart from each other under the effect of a push exerted by the compressible push member so that the daughter connectors are retracted, and a compressed configuration in which the lower plate and the upper plate are brought closer to each other so that the daughter connectors are deployed protruding from the upper plate;

a removable support assembly comprising a cartridge suitable for receiving an electric battery and having a lower part and an upper part between which the electric battery may be placed, in which said lower part is adapted to be received within the base space and supports mother connectors capable of electrically interconnecting with the daughter connectors in the compressed configuration, and of electrically disconnecting with the daughter connectors in the idle configuration, and in which the motherboard is mounted on the removable support assembly and is electrically connected to the mother connectors; and a protective cover capable of being mounted on and around the removable support assembly, said removable support assembly being movable in sliding, with the protective cover, in the base space up to a final position in which the lower part of the cartridge exerts a push on the upper plate, against the compressible push member, so that the compressible retraction assembly is in compressed configuration so that the mother connectors are electrically interconnected with the daughter connectors; and an interlocking system cooperating with the protective cover and the base to, in a locked position, lock the protective cover and the removable support assembly in the final position and ensure the electrical and mechanical coupling between the two electronic boards and to, in an unlocked position, release the protective cover and the removable support assembly which are pushed under the effect of the compressible push member and ensure the electrical and mechanical uncoupling between the two electronic boards.

Thus, the disclosure proposes to use the compressible retraction assembly which allows, in the idle configuration, to maintain the daughter connectors of the daughterboard in the retracted position, which has the advantage of protecting them. Then, simply couple this compressible retraction assembly to the lower part of the cartridge of the removable support assembly, then push this removable support assembly with the protective cover, which will guide the daughter connectors of the daughterboard before ensuring the interconnection between these daughter connectors and the mother connectors, and therefore the electrical interconnection between the two boards, while protecting the electronic boards, as well as the different connectors including the mother and secondary connectors, and also the electric battery when present. And finally, the interlocking system locks the protective cover on the base and therefore locks the mechanical interconnection between the two boards.

Thus, with the disclosure, the connection process, both mechanical and electrical, is quick (just push the protective cover then lock it with the interlocking system), reliable (because the daughter connectors are protected and guided throughout the connection, and also disconnection, phase), and with a bridge break for power and data between the two electronic boards (because as soon as the protective cover is unlocked, the compressible push member will push the removable support assembly and automatically provide disconnection and electrical isolation of the power and data lines, hence the "force feedback" nature of the force feedback and interlocking coupling system).

It should also be noted that this connection process guides and protects the daughter connectors from bending (by being guided in the lower and upper orifices of the two plates) or any other mechanical damage, while providing good insulation in a design resistant to vibrations and shocks.

This disclosure may be used by hand without requiring special tools, except possibly with regard to the interlocking system, depending on the locking technology chosen.

In addition, the disclosure allows a great modularity or interchangeability, because the base, the compressible retraction assembly, the removable support assembly, the protective cover, the interlocking system and the motherboard may be common, and only the daughterboard may change. Also, it is possible to have a large number of elements in common which can be exploited for electronic devices having distinct secondary electronic boards, and therefore for example for electronic devices having distinct sensor boards operating with distinct sensors.

According to one variant, the protective cover is mounted in a sealed manner on and around the removable support assembly, by means of a seal interposed between the protective cover and the removable support assembly.

According to another variant, the removable support assembly integrates a keying system allowing mounting of the electric battery in a given mounting direction, and prohibiting its mounting in a reverse direction, to avoid any short circuit by reversing the polarity of the electric battery once installed in the removable support assembly.

According to one feature, in the idle configuration, the daughter connectors are retracted so as not to protrude from the upper plate.

Thus, the daughter connectors are completely protected by the plates of the compressible retraction assembly.

According to one variant, in the idle configuration, the daughter connectors are retracted, protruding from the upper plate by a minimal and tolerable length, for example 1 to 3 millimeters, which is of course less than the protrusion length in the compressed configuration, which may for example be in the range of 5 to 8 millimeters.

According to one possibility, the upper plate is movable in translation relatively to the lower plate along the longitudinal axis, with a mechanical stop which prevents the upper plate from moving away from the lower plate beyond the idle configuration.

In this way, the upper plate does not risk moving beyond the idle configuration unexpectedly.

According to another possibility, the lower plate and the upper plate are mechanically connected to each other.

According to another possibility, one of the lower plate and of the upper plate comprises a male snap element engaged in a female snap element provided on the other of the lower plate and of the upper plate, said male snap element forming a guide in translation for the upper plate as well as the mechanical stop for this upper plate.

In a particular embodiment, the lower plate is fastened, for example by screwing, on the daughterboard.

According to one feature, the at least one compressible push member is chosen from a peak-to-peak wave spring, a leaf spring, a helical spring, a compressible spring, an elastic leaf or a set of several elastic leaves.

The choice of the peak-to-peak wave spring proves to be particularly advantageous because it makes it possible to reduce the height of the compressible retraction assembly (along the longitudinal axis) and thus make it as compact as possible, while maintaining controlled deflection providing the desired spring effect, namely the push on the upper plate which will provide a rapid disconnection of the electrical connection between the daughter connectors and the mother connectors.

According to another feature, the sleeve of the base has an indexing element internally, and the lower part of the cartridge has externally a complementary indexing element capable of cooperating with the indexing element to index the mounting of said lower part within the base space.

This indexing makes it easy to ensure that the mother connectors align with the daughter connectors, by aligning the mother connectors and the daughter connectors which are associated for the power supply and by aligning the mother connectors and the daughter connectors which are associated for data transmission between the two boards.

Alternatively, this indexing may be obtained with a base space and a lower part of complementary and non-circular shapes.

In a particular embodiment, the lower part of the cartridge has connection orifices which internally receive the mother connectors, these connection orifices being aligned with the daughter connectors, so that, in the final position, the daughter connectors enter the connection orifices to couple with the mother connectors.

Advantageously, the connection orifices have flared inputs, for example of conical shape, which facilitates connection to the mounting clearances.

It should be noted that the daughter connectors may be male pins which engage in female mother connectors, or conversely that the daughter connectors may be female pins within which engage male mother connectors.

Advantageously, the female pins are formed from so-called hyperboloid contact sockets; a hyperboloid contact socket is formed of a network of wires disposed in a hyperboloid and forming an angle with respect to the axis of the associated male pin. When the male pin is inserted into this socket, the wires stretch so as to grip the male pin elastically, these wires thus forming several continuous contact lines.

According to an advantageous embodiment, two power contacts for the electric battery are provided on the cartridge, including a lower contact disposed on the lower part and an upper contact disposed on the upper part, and in which the upper contact is connected to the motherboard and the lower contact is connected to the mother connectors which are configured so that:

in the locked position of the interlocking system, the motherboard and the daughterboard are electrically connected to the two power contacts so that they may be electrically powered by the electric battery; and in the unlocked position of the interlocking system, the motherboard and the daughterboard are electrically disconnected from the two power contacts so as not to be electrically powered by the electric battery.

Thus, the unlocking of the interlocking system, combined with the push exerted by the compressible push member, allows a rapid and secure cutting of the electrical power not only of the daughterboard but also of the motherboard; at least one of the mother contactors ensuring the electrical supply of the motherboard passing through the daughterboard, so that the mechanical and electrical disconnection of the daughterboard leads to a power cut for the motherboard.

According to one possibility, the lower part of the cartridge supports an intermediate board on which the mother connectors are mounted, and the motherboard is disposed on the upper part of the cartridge, the intermediate board and the motherboard being connected by an electrical connection extending along the cartridge between the lower part and the upper part.

Thus, the motherboard is provided opposite the mother connectors, in relation to the cartridge (and therefore in relation to the electric battery when present).

According to another possibility, the motherboard comprises a transmitter which is connected to an antenna disposed within the protective cover in the final position.

Thus, the electronic device forms a connected device, which may transmit data circulating between the two boards, and more specifically data from the daughterboard, which may for example be measurement data.

In an advantageous embodiment, the interlocking system comprises a locking cap or sleeve mounted around the protective cover and provided with a fastening device for fastening on the base.

Fastening the locking cap or sleeve may be done for example by screwing directly onto the base, or by means of a screw passing through the cap and screwed or pressed onto the base, or by means of a snap on the base, or a bolt or any other mechanical locking means.

In another embodiment, the daughterboard is a sensor board intended to manage sensor data from a sensor.

The disclosure also relates to a measurement system comprising an electronic device as described above, and a sensor for measuring a physical parameter mounted on the base and connected to the daughterboard which is a sensor board.

In a non-limiting manner, the sensor for measuring a physical parameter is chosen from a temperature sensor, a pressure sensor, a proximity sensor, an optical sensor, an acoustic sensor, a speed sensor, a motion sensor, an acceleration sensor, a gyroscopic sensor.

BRIEF DESCRIPTION OF THE DRAWINGS

Other characteristics and advantages of the present disclosure will appear on reading the detailed description below, of non-limiting exemplary implementations, made with reference to the appended figures in which.

DETAILED DESCRIPTION

Figure 1:
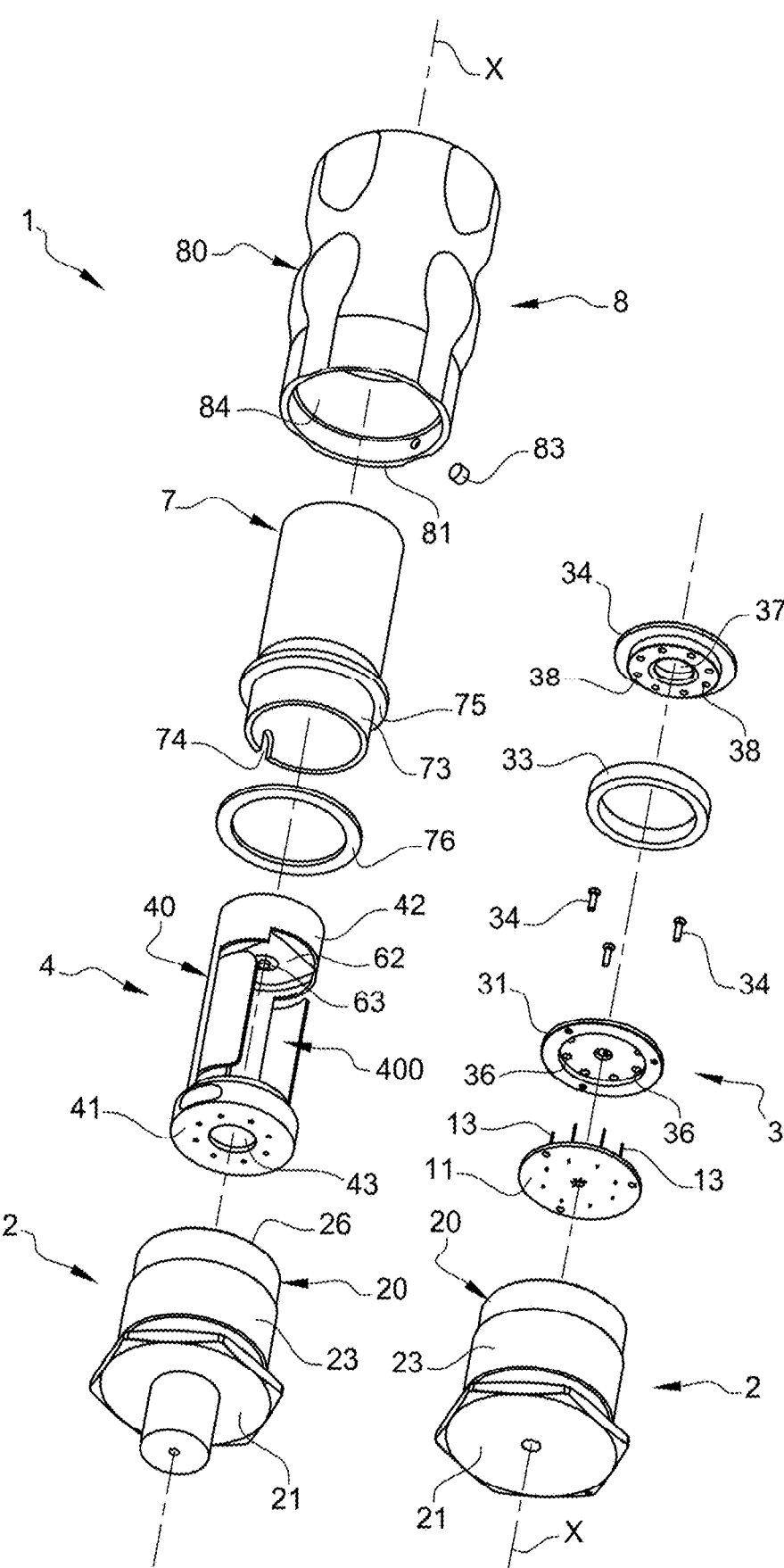
FIG. 1 is a schematic perspective and exploded view of an electronic device (on the left) according to an exemplary embodiment of the disclosure and of an assembly (on the right) comprising the base as well as the daughterboard and the compressible retraction assembly of the electronic device.
Figure 2:
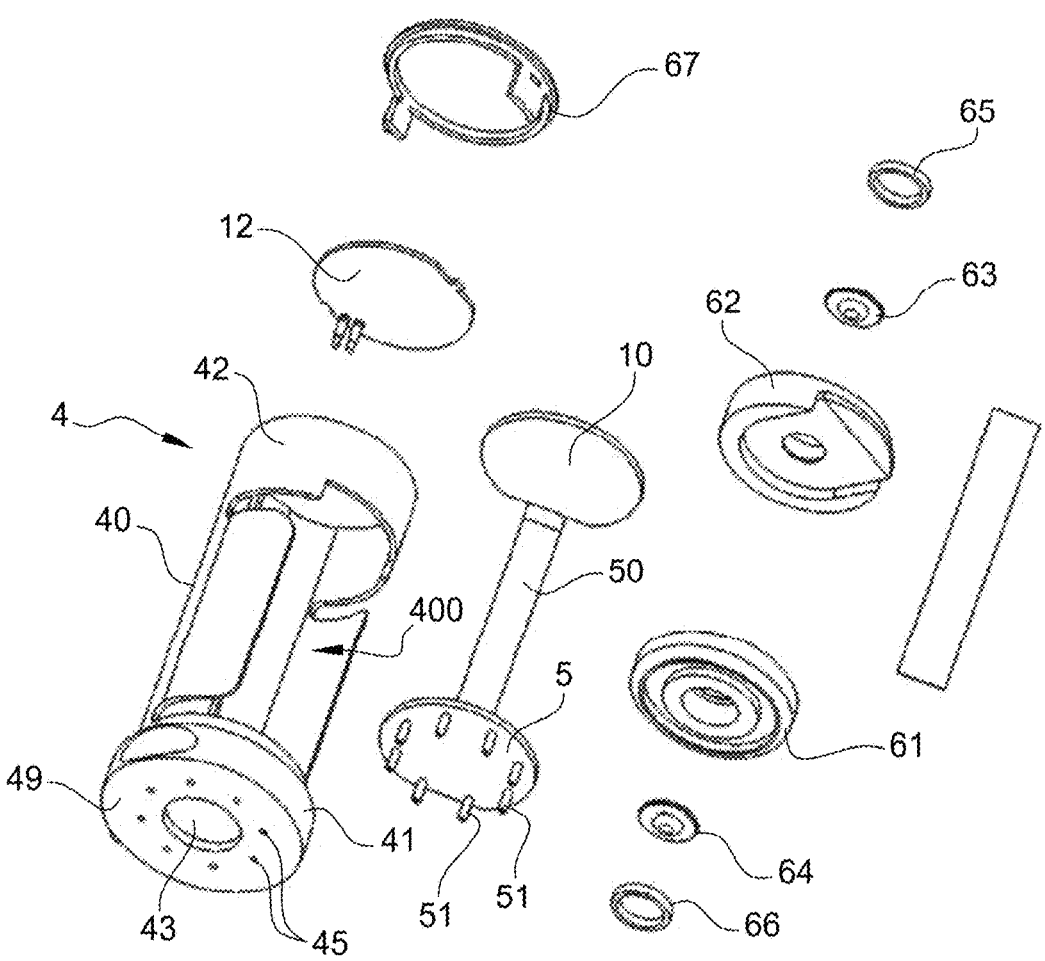
FIG. 2 is a schematic perspective and exploded view of an assembly comprising the motherboard and the removable support assembly of the electronic device.

With reference to FIGS. 1 and 2, an electronic device 1 according to an exemplary embodiment of the disclosure, comprises two electronic boards 10, 11 composed of a motherboard 10 and a daughterboard 11. In the example described and illustrated, the daughterboard 11 is a sensor board intended to manage sensor data from a sensor for measuring a physical parameter fastened on the electronic device 1, and the motherboard 10 is intended to be in connection with the daughterboard 11 in order to recover the sensor data and process them, and in particular to communicate them remotely. To do this, the motherboard 10 may comprise a transmitter which is connected to an antenna 12, such as a PCB antenna, connected to the motherboard 10. Of course, the disclosure may be considered for different types of daughterboard forming an expansion board for the motherboard in order to provide an additional functionality.

According to the disclosure, this electronic device 1 is provided with a force feedback and interlocking coupling system making it possible to mechanically and electrically couple the two electronic boards 10, 11.

With reference to FIGS. 1 and 2, this force feedback and interlocking coupling system comprises a base 2 including a sleeve 20 extending along a longitudinal axis X and a bottom wall 21, which closes the lower part of the sleeve 20, so that this sleeve 20 internally delimits, with the bottom wall 21, a base space 22 of circular section, forming a blind hole open on an upper end of the sleeve 20, opposite the bottom wall 21.

The sleeve 20 may have an external thread 23, around the base space 22. In addition, the sleeve 20 internally has an indexing element which is in the form of an indexing groove 24 emerging onto the upper part 26 of the sleeve 20 and extending parallel to the longitudinal axis X.

Figure 4:
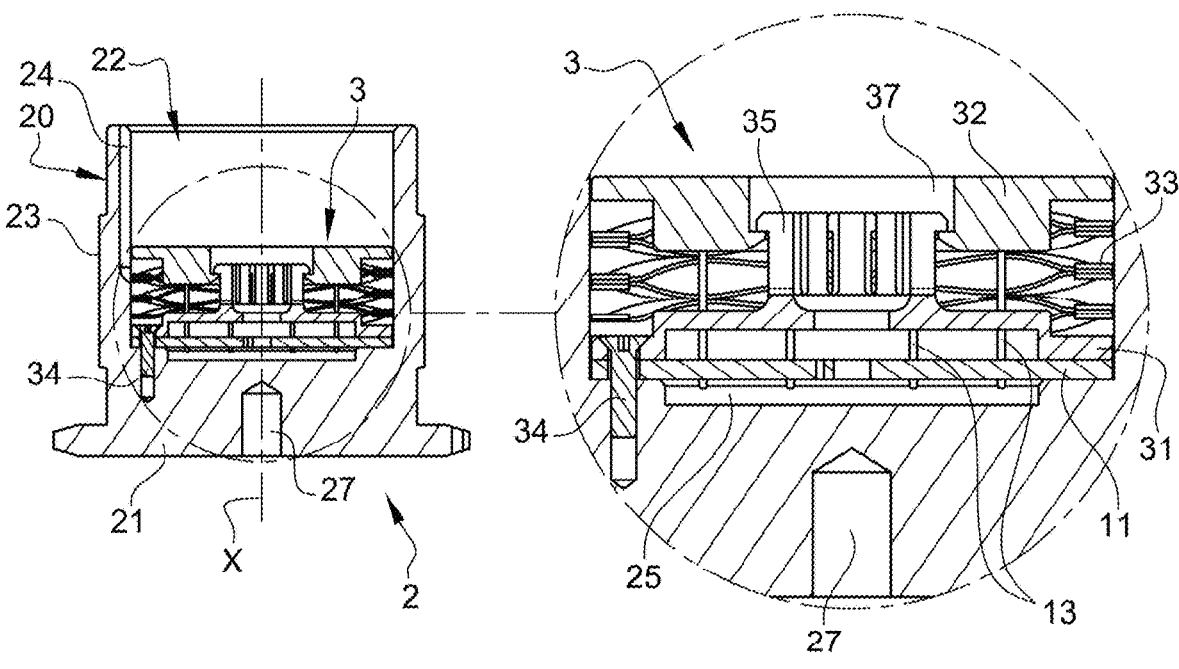
FIG. 4 is a schematic axial sectional view of the assembly of FIG. 3, in the idle configuration, with a central zoom.
Figure 5:
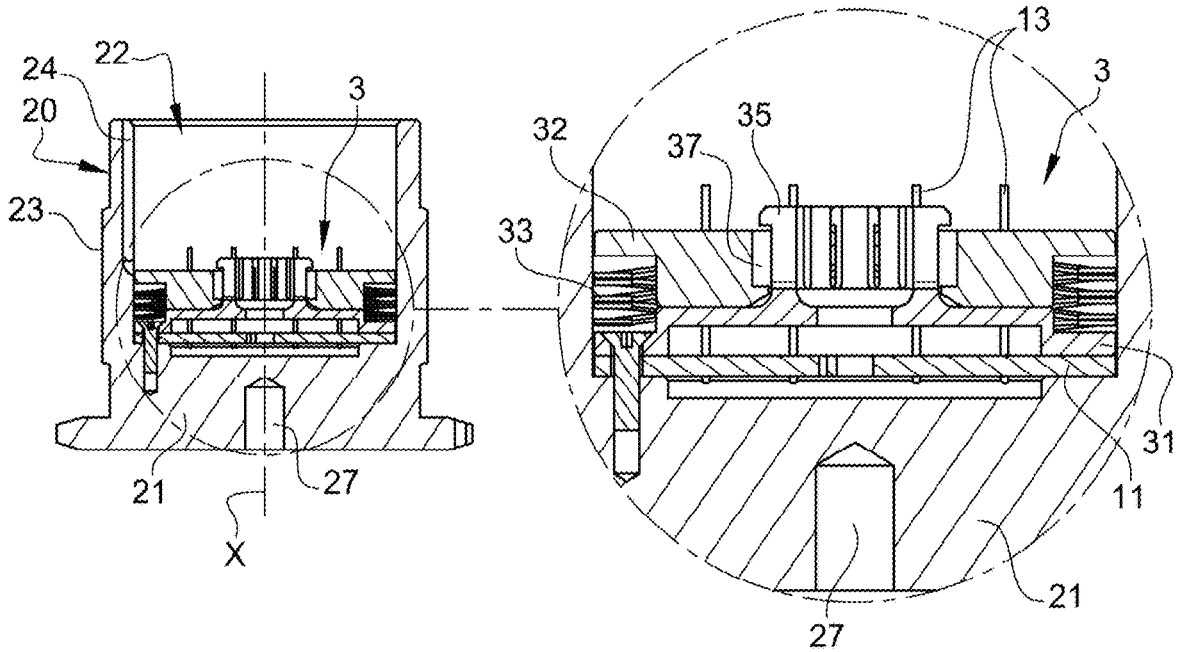
FIG. 5 is a schematic axial sectional view of the assembly of FIG. 3, in the compressed configuration, with a central zoom.
Figure 8:
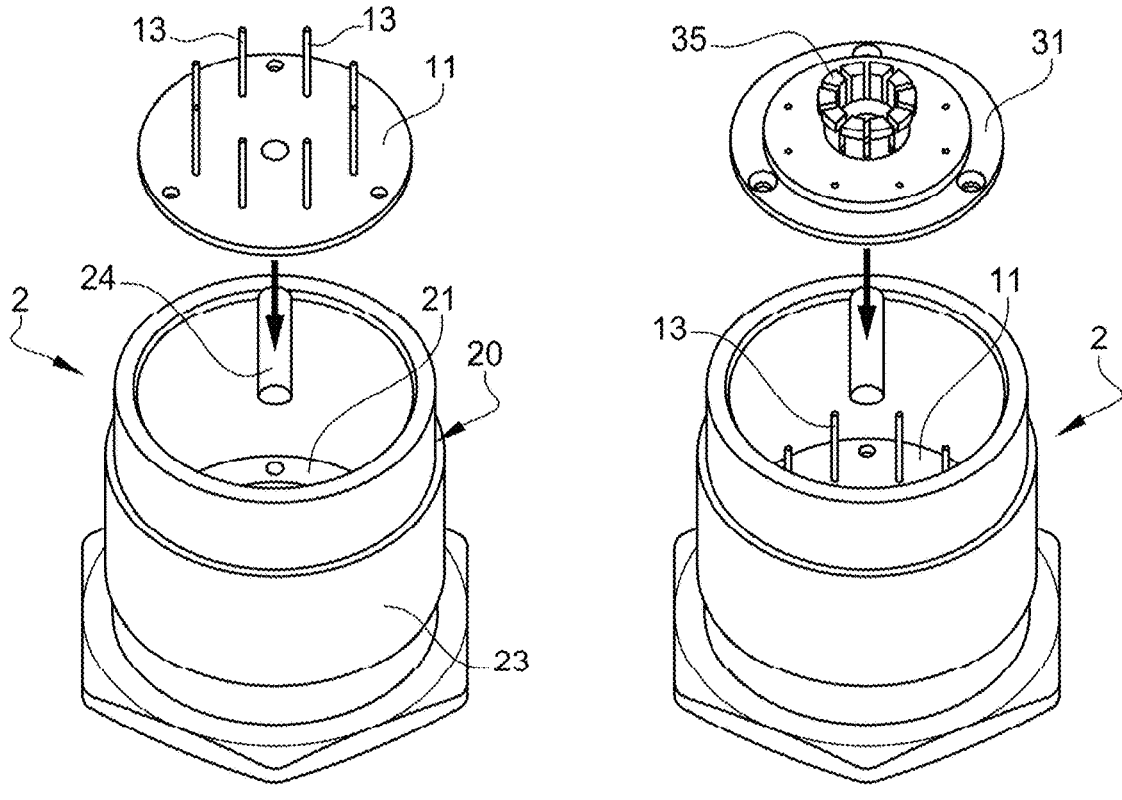
FIG. 8 is a schematic perspective view of the mounting of the daughterboard within the base (on the left) followed by the mounting of the lower plate of the compressible retraction assembly on the daughterboard (on the right)

In the electronic device 1, the daughterboard 11 is received within the base space 22, in other words inside the base 2 and its sleeve 20, and comes to bear on the bottom wall 21, as illustrated in FIGS. 4, 5 and 8. A recess 25 may be provided in the center of the bottom wall 21 to prevent the electronics of the daughterboard 11 from bearing on the bottom wall 23. The daughterboard 11 has daughter connectors 13 extending parallel to the longitudinal axis X and projecting from the top of the daughterboard 11; these daughter connectors 13 being turned towards the upper part of the sleeve 20.

The force feedback and interlocking coupling system also comprises a compressible retraction assembly 3 received within the base space 22, in other words within the base 2 and its sleeve 20, as illustrated in FIGS. 4, 5, 8 to 10. This compressible retraction assembly 3 comprises two plates 31, 32 between which at least one compressible push member 33 is interposed, the two plates comprising a lower plate 31 and an upper plate 32.

Figure 9:
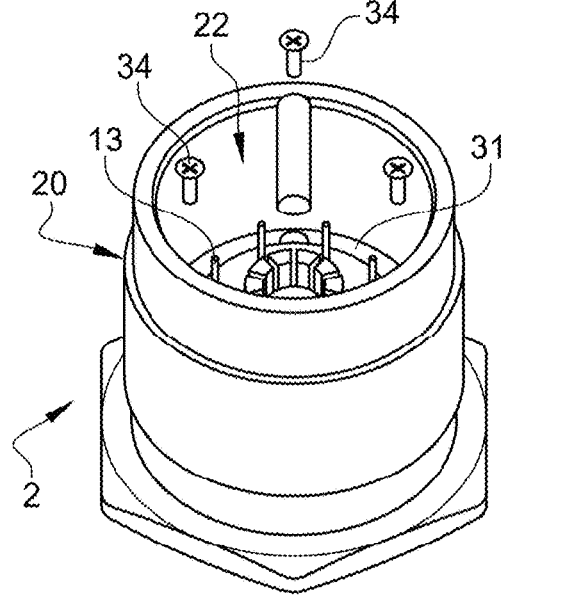
FIG. 9 is a schematic perspective view of the screwing of the lower plate of the compressible retraction assembly on the daughterboard and on the base.
Figure 9:
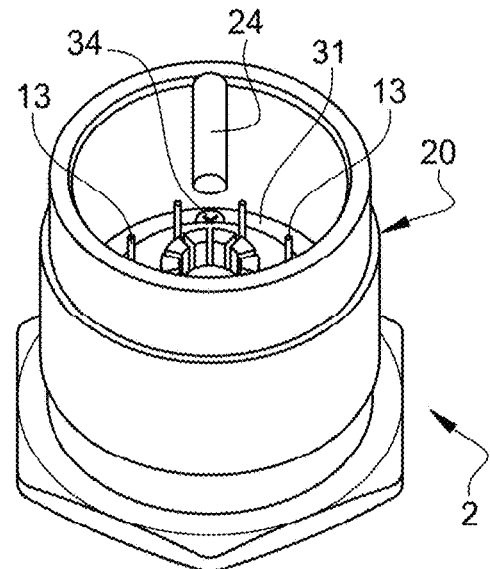
Figure 10:
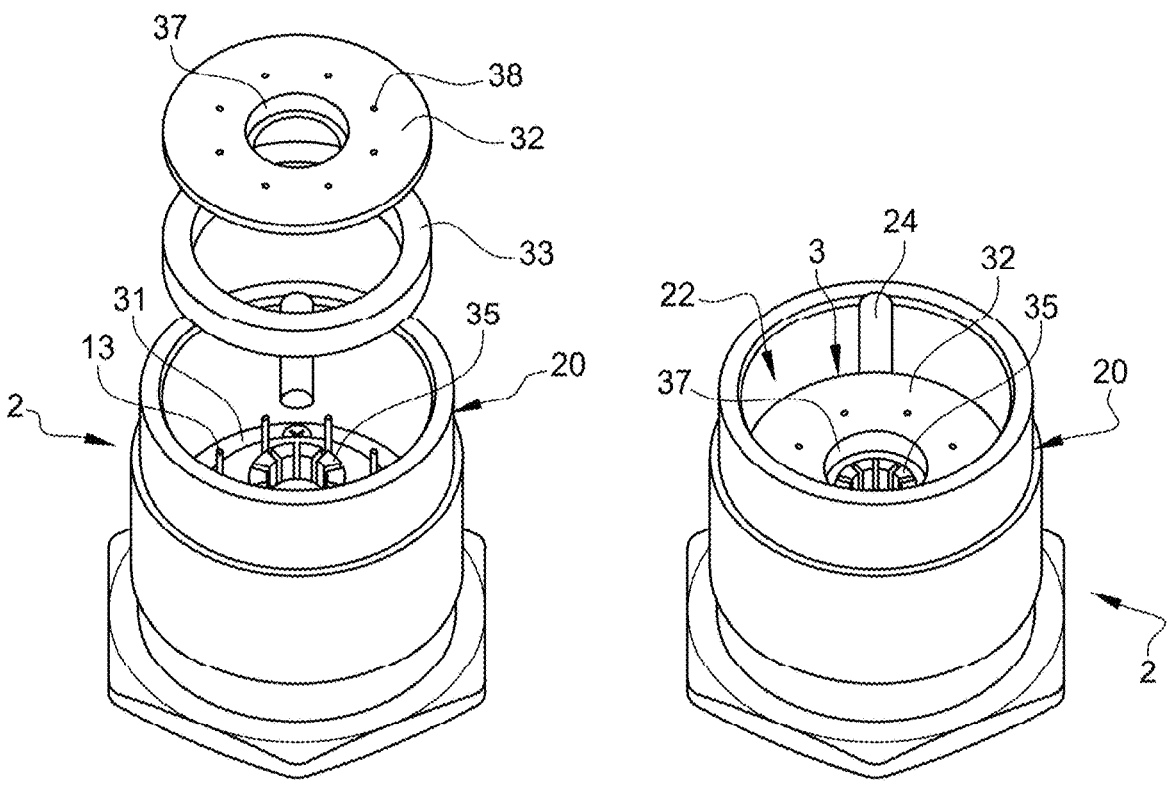
FIG. 10 is a schematic perspective view of the mounting of the upper plate within the base, on the lower plate, with the interposition of the compressible push member.

The lower plate 31 is placed on the daughterboard 11 and the lower plate is fastened, by means of screws 34, on the daughterboard 31. More precisely, the screws 34 pass through both the lower plate 31 and the daughterboard 11 to be screwed onto the bottom wall 21 of the base 2, as illustrated in FIGS. 4, 5 and 9. Thus, the daughterboard 11 and the lower plate 31 are fastened to the bottom wall 21. The lower plate 31 comprises, in its center, a male snap element 35 which comprises a plurality of elastic tabs, the free ends of which end in hooks, and which are distributed in a circle about the longitudinal axis X. The lower plate 31 is provided with lower orifices 36 through which the daughter connectors 13 pass.

The upper plate 32 is mechanically connected to the lower plate 31 and the upper plate 32 is movable in translation relatively to the lower plate 31 along the longitudinal axis X. To do this, the upper plate 32 has a female snap element 37, which is in the form of an orifice in its center, so that the male snap element 35 of the lower plate 31 is engaged in the female snap element 37 of the upper plate 32. The male snap element 35 thus forms a guide in translation for the upper plate 32 as well as the mechanical stop for this upper plate 32, by means of the hooks of the elastic tabs which prevent the upper plate 32 from moving away from the lower plate 31 beyond a given distance, associated with an idle configuration. The upper plate 32 is also provided with upper orifices 38 aligned with the lower orifices 36 to allow the passage of the daughter connectors 13.

The compressible push member 33 is chosen from a peak-to-peak wave spring, a leaf spring, a helical spring, a compressible spring, an elastic leaf or a set of several elastic leaves.

Figure 3:
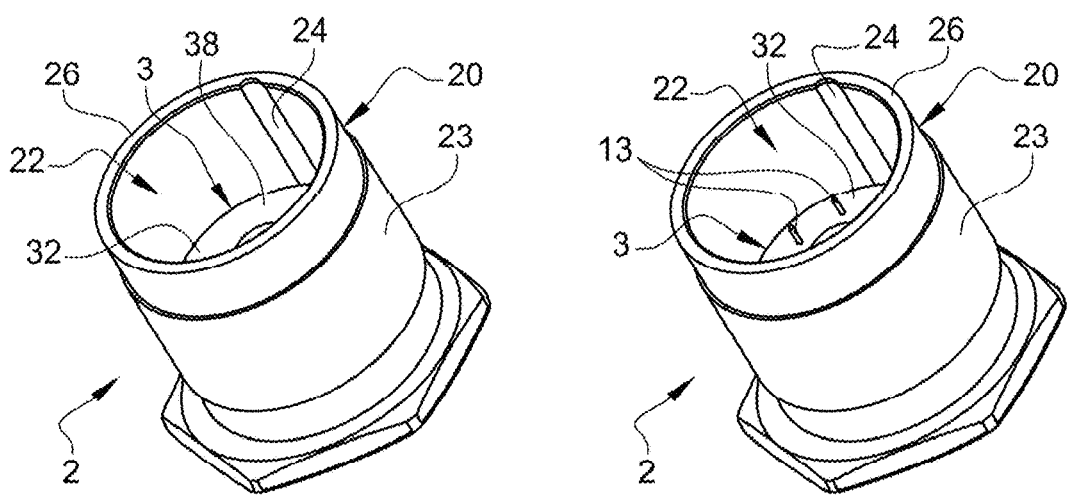
FIG. 3 is a schematic perspective view of the assembly comprising the base as well as the daughterboard and the compressible retraction assembly, with the compressible retraction assembly in idle configuration (on the left) and in compressed configuration (on the right)

Once the upper plate 32 is mechanically connected to the lower plate 31, the compressible retraction assembly 3 is configurable between:

- an idle configuration (visible in FIG. 3 on the left and in FIG. 4) in which the lower plate 31 and the upper plate 32 are spaced apart from each other within the maximum limit authorized by the male snap element 35, under the effect of a push exerted by the compressible push member 33 so that the daughter connectors 13 are retracted while not protruding from the upper plate 32; and
- a compressed configuration (visible in FIG. 3 on the right and in FIG. 5) in which the lower plate 31 and the upper plate 32 are brought closer to each other, under the effect of an external push exerted on the upper plate 32 against the push exerted in the opposite direction by the compressible push member 33, so that the daughter connectors 13 are deployed protruding from the upper plate 32.

Thus, the compressible push member 33 exerts a push which elastically returns the compressible retraction assembly 3 towards the idle configuration, in the absence of such an external push.

The force feedback and interlocking coupling system comprises a removable support assembly 4 comprising a cartridge 40 defining a battery space 400 suitable for receiving an electric battery 9 (visible in FIG. 11), and this cartridge 40 has a lower part 41 and an upper part 42 between which the electric battery 9 may be placed.

Figure 12:
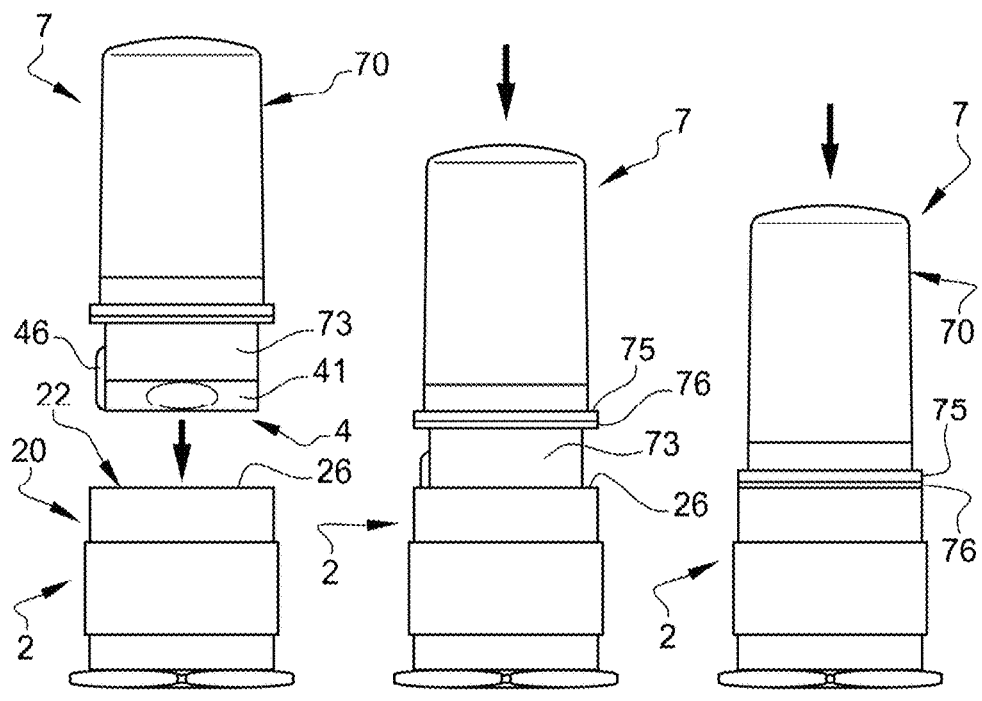
FIG. 12 is a schematic perspective view of the mounting of the assemblage cover/removable support assembly of FIG. 11 on the assemblage base/daughterboard/compressible retraction assembly of FIG. 10.

The lower part 41 of the cartridge 40 is adapted to be received within the base space 22, in other words within the base 2 and its sleeve 20 (as illustrated in FIG. 12), and this lower part 41 supports an intermediate board 5 on which are mounted mother connectors 51 capable of electrically interconnecting with the daughter connectors 13 of the daughterboard 11 in the compressed configuration, and of electrically disconnecting with the daughter connectors 13 in the idle configuration. The motherboard 10 is for its part disposed on the upper part 42 of the cartridge 40, and moreover the intermediate board 5 and the motherboard 10 are connected by an electrical connection 50 (for example of the tape or layer type) extending along the cartridge 40 between the lower part 41 and the upper part 42. Also, the motherboard 10 is mounted on the removable support assembly 4 and is electrically connected to the mother connectors 51.

The lower part 41 has a lower face 49 facing the upper plate 32, and this lower part 41 forms a mount, of circular section, for the removable support assembly 4 which may be inserted within the base space 22, and which may bear through its lower face 41 on the upper plate 32, against the compressible push member 33. The lower face 49 of the lower part 41 has a central recess 43 in order to allow partially entry the male snap element 35 of the lower plate 31 when the lower part 41 compresses the compressible retraction assembly 3. Indeed, as visible in FIG. 5, in compressed configuration, the male snap element 35 protrudes slightly from the upper plate 32.

The lower part 41 has an external shoulder 48, of circular shape on its outer periphery. In addition, the lower part 41 has a plate 44, on the top (in other words facing the side of the electric battery 9), on which the intermediate board 5 is disposed, and this lower part 41 also has connection orifices 45 which pass through the lower part 41, emerging into the plate 44. When the intermediate board 5 rests on the plate 44, the mother connectors are internally received in these connection orifices 45, and these connection orifices 45 are aligned with the daughter connectors 13, so that, in a final locked position, the daughter connectors 13 enter the connection orifices 45 to couple with the mother connectors 51.

Figures 6, 7:
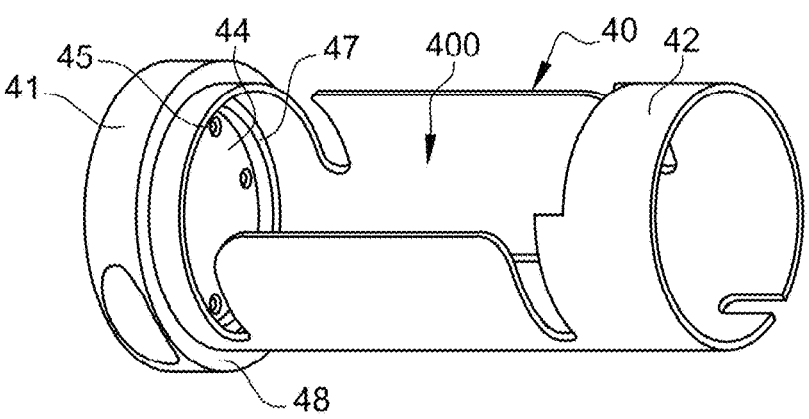
FIG. 6 is a schematic perspective view of the cartridge of the removable support assembly.
FIG. 7 is a schematic axial sectional view of the cartridge of the removable support assembly.

The lower part of the cartridge 40 externally has a complementary indexing element 46 which is in the form of a projecting boss extending parallel to the longitudinal axis X, in which this complementary indexing element 46 is shaped to cooperate with the indexing groove 24 (by engaging inside it) provided in the sleeve 20 (inside the base space 22) to index the mounting of the lower part 41 of the cartridge 40 within the base space 22. This indexing ensures an alignment of the connection orifices 45, and therefore of the mother connectors 51, with the daughter connectors 13. As visible in FIG. 7, the connection orifices 45 having flared inputs 450, for example of conical shape, in order to facilitate the guiding and the insertion of the daughter connectors 13 within the connection orifices 45.

In addition, the removable support assembly 4 comprises two power contacts 63, 64 for the electric battery 9. More specifically, the removable support assembly 4 comprises:

an upper battery support 62 mounted on the upper part 42 of the cartridge 40, where this upper battery support 62 integrates an upper contact 63 connected to the motherboard 10, an upper spring 65 being provided to push the upper contact 63 against an upper contact terminal of the electric battery 9; and a lower battery support 61 mounted on the lower part 41 of the cartridge 40, on an upper bearing 47 provided above the plate 44, where this lower battery support 61 integrates a lower contact 64 connected to the intermediate board 5, a lower spring 66 being provided to push the lower contact 64 against a lower contact terminal of the electric battery 9.

Thus, the lower battery support 61 covers the intermediate board 5. Furthermore, the motherboard 10 is mounted on the upper battery support 62 (and therefore on the upper part 42 of the cartridge 40), just like the antenna 12. A locking ring 67 is fastened on the upper part 42 to lock and block the upper battery support 62, as well as the motherboard 10 and the antenna 12.

Advantageously, the cartridge 70 has a keying system allowing the electric battery 9 to be mounted in the correct direction and thus avoid any short circuit by reversing the polarity of the electric battery 9.

The force feedback and interlocking coupling system comprises a protective cover 7 which comprises a socket 70 having an open lower end 71 and a closed upper end 72. This socket 70 has a lower section 73 in which a longitudinal notch 74 forming an indexing element complementary to the complementary indexing element 46 is provided. This lower section 73 is extended by an external shoulder 75 against which an O-ring type seal 76 is mounted.

Figure 11:
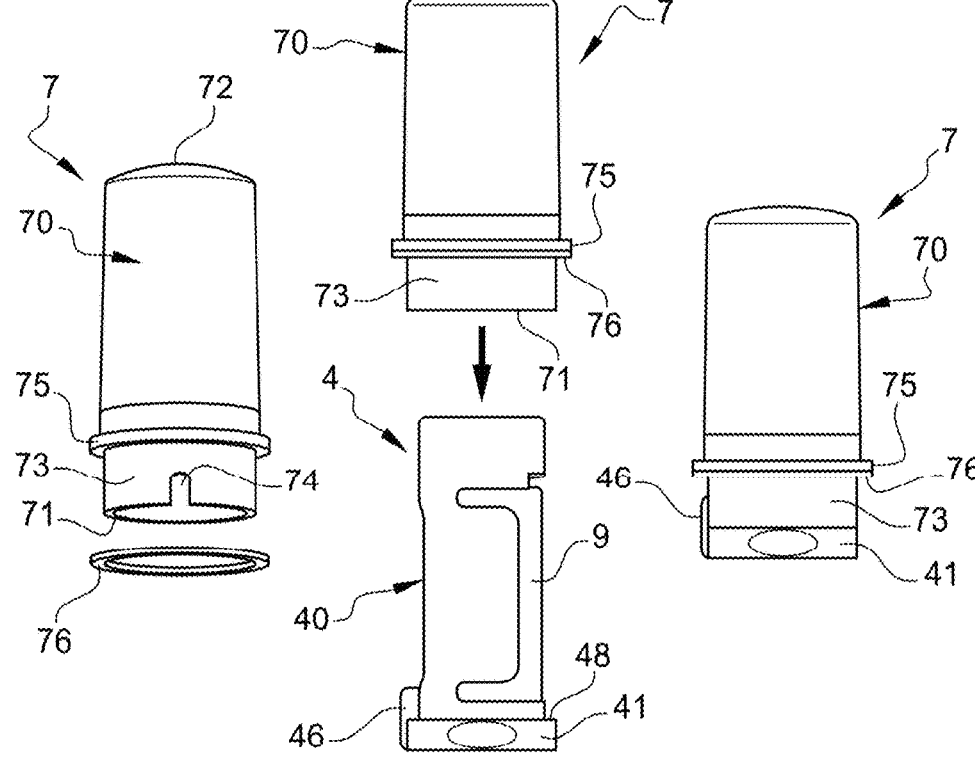
FIG. 11 is a schematic perspective view of the mounting of the protective cover to envelop the removable support assembly.

As illustrated in FIG. 11, this protective cover 7 is able to be mounted on and around the removable support assembly 4, by inserting the removable support assembly 4 within the socket 70, through its open lower end 71, until this lower end 71 abuts against the external shoulder 48 of the lower part 41 of the cartridge 40; the complementary indexing element 46 engaging within the notch 74 to thus index the mounting of the protective cover 7 on the removable support assembly 4.

With reference to FIG. 12, once the protective cover 7 mounted on the removable support assembly 4, this removable support assembly 4 can be moved in sliding, with the protective cover 7, in the base space 22, by inserting the lower part 41 within the base space 22, then continuing to push on the protective cover 7, until the external shoulder 75 of the socket 70 abuts on the upper end 26 of the sleeve 20. There is an interposition of the seal 76 between this external shoulder 75 of the protective cover 7 and this upper end 26 of the base 2, thus providing a sealing of the mounting of the protective cover 7 on the base 2, and therefore a sealing for the electronic boards 10, 11, the antenna 12 and the electric battery 9 which are disposed within this base 2 and this protective cover 9.

In this position, called the final position (on the right in FIG. 12), the lower part 41 of the cartridge 40 exerts a push on the upper plate 32, against the compressible push member 33, so that the compressible retraction assembly 3 is in compressed configuration so that the mother connectors 51 are electrically interconnected with the daughter connectors 13.

Figure 13:
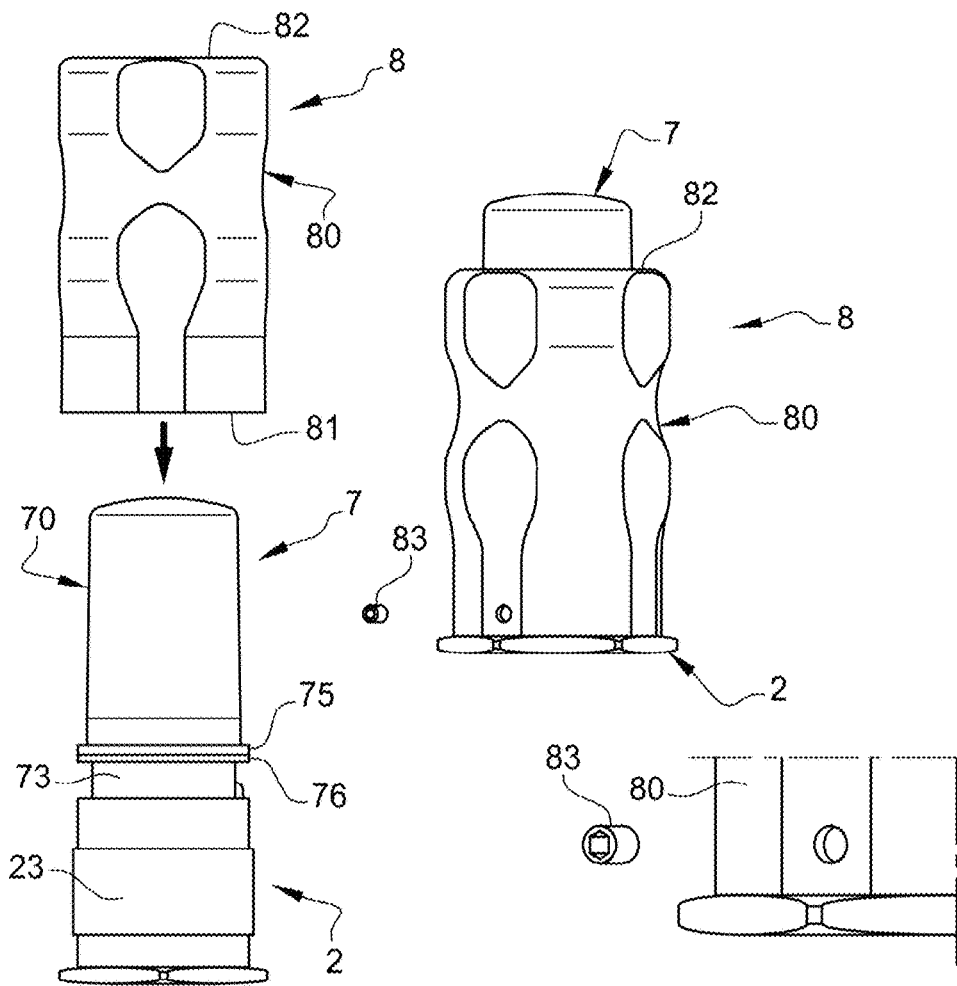
FIG. 13 is a schematic perspective view of the mounting of the interlocking system on the assemblage of FIG. 12 and its locking on the base.

In the absence of a push exerted on the cartridge 40 (in the center in FIG. 12 and on the left in FIG. 13), the compressible push member 33 naturally pushes on the upper plate 32, thus pushing the lower part 41 of the cartridge 40, so that the external shoulder 75 of the socket 70 leaves its stop on the upper end 26 of the sleeve 20, thus cutting the electrical connection between the mother connectors 51 and the daughter connectors 13.

The force feedback and interlocking coupling system comprises an interlocking system 8 comprising a locking sleeve 80 open at its two ends, including a lower end 81 intended to be locked on the base 2 and an upper end 82 intended to cooperate with the protective cover 7.

This locking sleeve 80 is therefore mounted around the protective cover 7, by passing this protective cover 7 through the lower end 81, then lowering the locking sleeve 80 which causes the locking sleeve 80 to push on the protective cover 7 towards the final position, until reaching a locked position (on the right in FIG. 13) in which the locking sleeve 80 locks the protective cover 2 and the removable support assembly 4 in the final position, thus ensuring the electrical and mechanical coupling between the two electronic boards 10, 11.

The locking sleeve 80 may be locked on the base 2 for example by screwing, by providing an internal thread 84 in the locking sleeve 80 to be able to screw onto the external thread 23 of the sleeve 20. In addition to or as a variant of such locking by screwing, it can be planned to use a junction screw 83 (illustrated on the right in FIG. 13), such as for example a pressure screw, which passes through the locking sleeve 80 to cooperate with the sleeve 20 of the base 2 and thus block the interlocking system 8 in the locked position.

By unlocking the locking sleeve 80 of the base 2 and remounting it, the interlocking system 8 moves to the unlocked position, and then the protective cover 7 and the removable support assembly 4 are automatically released because they are pushed under the effect of the compressible push member 33, which ensures an electrical and mechanical uncoupling between the two electronic boards 10, 11.

Advantageously, the intermediate board 5 (or at least one of the mother connectors 51) and the daughterboard 10 are configured so that:

in the locked position of the interlocking system 8, the motherboard 10 and the daughterboard 11 are connected to each other and are also electrically connected to the two power contacts 63, 64 to be able to be electrically powered by the electric battery 9; and in the unlocked position of the interlocking system 8, the motherboard 10 and the daughterboard 11 are disconnected from each other (as already described) but are also electrically disconnected from at least one of the two power contacts 63, 64 so as not to be electrically powered by the electric battery 9.

In other words, in the unlocked position, even the power supply of the motherboard 10 is automatically cut off.

Figure 14:
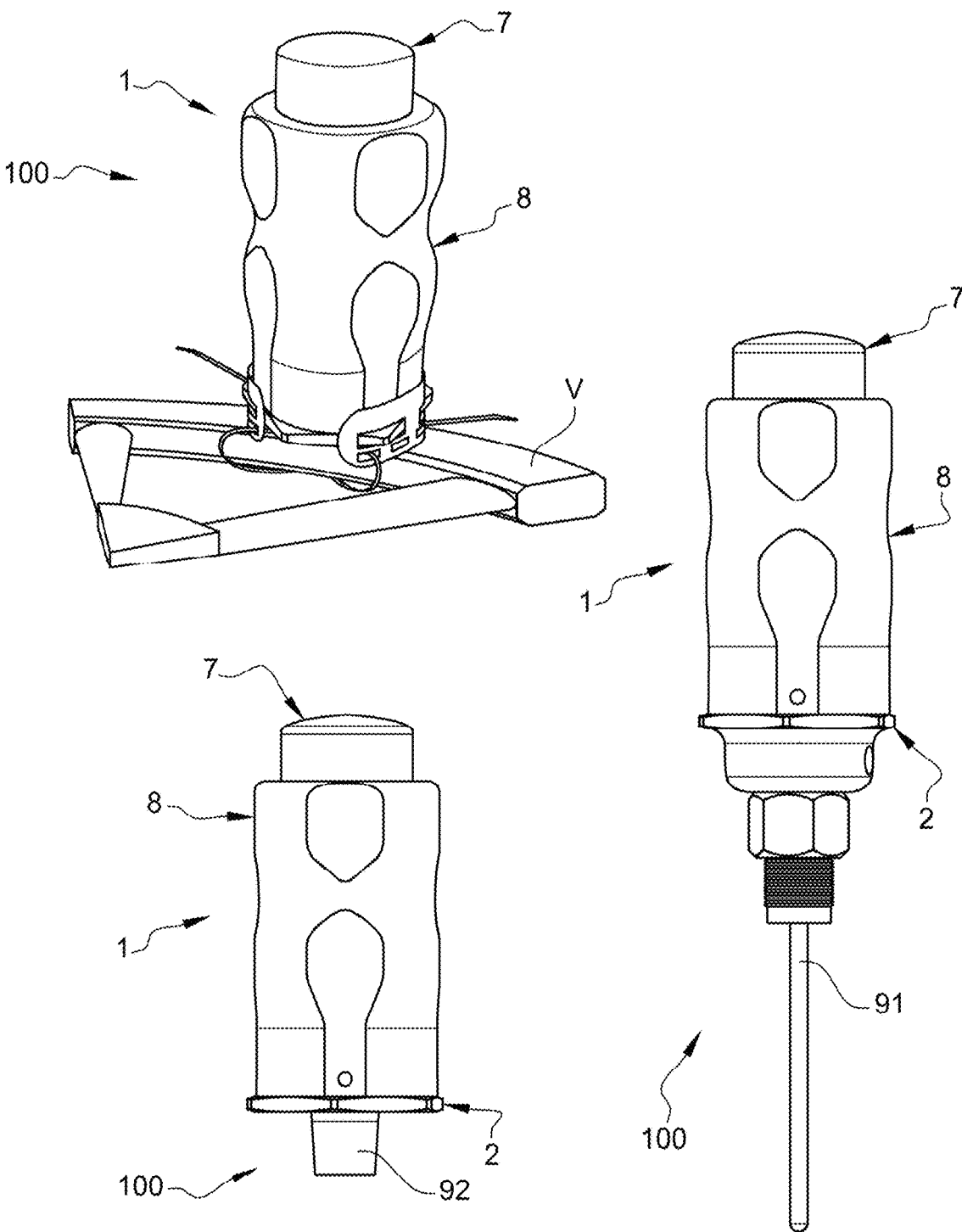
FIG. 14 is a schematic perspective view of three examples of measurement systems carried out with the disclosure, with a measurement system equipped with an acceleration sensor or a gyroscopic sensor (on the top left), a measurement system equipped with a temperature sensor (on the middle right) and a measurement system equipped with a pressure sensor (on the bottom left).

With reference to FIG. 14, this electronic device 1 may be associated with a sensor for measuring a physical parameter mounted on the base 2 and connected to the daughterboard 11, to form a measurement system 100, such as for example:

in the example at the top left, a measurement system equipped with an acceleration sensor and/or a gyroscopic sensor mounted on a valve V for valve position sensor server;

in the example in the middle right, a measurement system equipped with a temperature sensor 91 and in the example at the bottom left, a measurement system equipped with a pressure sensor 92.

The base 2 may thus have a threaded hole 27, provided in its bottom wall 21, on the outside, in order to fasten a sensor on the base 2. Other equivalent means may be provided for fastening the sensor on the base 2, such as for example means of fastening by snap-fastening, screwing, hooking, tightening, strapping, etc.

The invention claimed is:

1. An electronic device comprising two electronic boards composed of a motherboard and of a daughterboard, said electronic device comprising a force feedback and interlocking coupling system for mechanically and electrically coupling the two electronic boards, said force feedback and interlocking coupling system comprising:

a base including a sleeve extending along a longitudinal axis and internally delimiting a base space, wherein the daughterboard is received within the base space and has daughter connectors extending parallel to the longitudinal axis;

a compressible retraction assembly received within the base space, comprising two plates between which at least one compressible push member is interposed and including a lower plate placed on the daughterboard and provided with lower orifices through which the daughter connectors pass and an upper plate provided with upper orifices aligned with the lower orifices to allow the passage of the daughter connectors, said compressible retraction assembly being configurable between an idle configuration in which the lower plate and the upper plate are spaced apart from each other under the effect of a push exerted by the compressible push member so that the daughter connectors are retracted, and a compressed configuration in which the lower plate and the upper plate are brought closer to each other so that the daughter connectors are deployed protruding from the upper plate;

a removable support assembly comprising a cartridge capable of receiving an electric battery and having a lower part and an upper part between which the electric battery may be placed, wherein said lower part is adapted to be received within the base space and supports mother connectors capable of electrically interconnecting with the daughter connectors in the compressed configuration, and of electrically disconnecting with the daughter connectors in the idle configuration, and wherein the motherboard is mounted on the removable support assembly and is electrically connected to the mother connectors; and a protective cover capable of being mounted on and around the removable support assembly, said removable support assembly being movable in sliding, with the protective cover, in the base space to a final position in which the lower part of the cartridge exerts a push on the upper plate, against the compressible push member, so that the compressible retraction assembly is in the compressed configuration so that the mother connectors are electrically interconnected with the daughter connectors; and an interlocking system cooperating with the protective cover and the base to, in a locked position, lock the protective cover and the removable support assembly in the final position and ensure the electrical and mechanical coupling between the two electronic boards and to, in an unlocked position, release the protective cover and the removable support assembly which are pushed under the effect of the compressible push member and ensure the electrical and mechanical uncoupling between the two electronic boards.

2. The electronic device according to claim 1, wherein, in the idle configuration, the daughter connectors are retracted so as not to protrude from the upper plate.

3. The electronic device according to claim 1, wherein the upper plate is movable in translation relatively to the lower plate along the longitudinal axis, with a mechanical stop which prevents the upper plate from moving away from the lower plate beyond the idle configuration.

4. The electronic device according to claim 3, wherein the lower plate and the upper plate are mechanically connected to each other.

5. The electronic device according to claim 4, wherein one of the lower plate and of the upper plate comprises a male snap element engaged in a female snap element provided on the other of the lower plate and of the upper plate, said male snap element forming a guide in translation for the upper plate as well as the mechanical stop for this upper plate.

6. The electronic device according to claim 1, wherein the lower plate is fastened on the daughterboard.

7. The electronic device according to claim 1, wherein the at least one compressible push member is chosen among a peak-to-peak wave spring, a leaf spring, a helical spring, a compressible spring, an elastic leaf or a set of several elastic leaves.

8. The electronic device according to claim 1, wherein the sleeve of the base internally has an indexing element, and the lower part of the cartridge externally has a complementary indexing element capable of cooperating with the indexing element to index the mounting of said lower part within the base space.

9. The electronic device according to claim 8, wherein the protective cover comprises a socket having an open lower end and a closed upper end, said socket having a lower section on which an indexing element complementary to the complementary indexing element for indexing the mounting of the protective cover on the removable support assembly is provided.

10. The electronic device according to claim 1, wherein the lower part of the cartridge has connection orifices which internally receive the mother connectors, said connection orifices being aligned with the daughter connectors, so that, in the final position, the daughter connectors enter the connection orifices to couple with the mother connectors.

11. The electronic device according to claim 10, wherein the connection orifices having flared inputs.

12. The electronic device according to claim 1, wherein are provided on the cartridge two power contacts for the electric battery, including a lower contact disposed on the lower part and an upper contact disposed on the upper part, and wherein the upper contact is connected to the motherboard and the lower contact is connected to the mother connectors, where at least one of the mother connectors and the daughterboard are configured so that:

in the locked position of the interlocking system, the motherboard and the daughterboard are electrically connected to the two power contacts to be able to be electrically powered by the electric battery; and in the unlocked position of the interlocking system, the motherboard and the daughterboard are electrically disconnected from at least one of the two power contacts so as not to be electrically powered by the electric battery.

13. The electronic device according to claim 1, wherein the lower part of the cartridge supports an intermediate board on which the mother connectors are mounted, and the motherboard is disposed on the upper part of the cartridge, the intermediate board and the motherboard being connected by an electrical connection extending along the cartridge between the lower part and the upper part.

14. The electronic device according to claim 1, wherein the motherboard comprises a transmitter which is connected to an antenna disposed within the protective cover in the final position.

15. The electronic device according to claim 1, wherein the interlocking system comprises a locking cap or sleeve mounted around the protective cover and provided with a fastening device for fastening on the base.

16. The electronic device according to claim 1, wherein the daughterboard is a sensor board intended to manage sensor data from a sensor.

17. A measurement system comprising an electronic device according to claim 16, and a sensor for measuring a physical parameter mounted on the base and connected to the daughterboard.

18. The measurement system according to claim 17, wherein the sensor for measuring a physical parameter is chosen from a temperature sensor, a pressure sensor, a proximity sensor, an optical sensor, an acoustic sensor, a speed sensor, a motion sensor, an acceleration sensor, a gyroscopic sensor.

* * * * *